United States Patent
Magini et al.

(10) Patent No.: US 9,608,555 B2
(45) Date of Patent: Mar. 28, 2017

(54) METHOD FOR ACTUATING A POLYPHASE MACHINE

(75) Inventors: Fabio Magini, Hemmingen (DE); Paul Mehringer, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 351 days.

(21) Appl. No.: 14/123,341

(22) PCT Filed: May 11, 2012

(86) PCT No.: PCT/EP2012/058705
§ 371 (c)(1),
(2), (4) Date: Mar. 19, 2014

(87) PCT Pub. No.: WO2012/163651
PCT Pub. Date: Dec. 6, 2012

(65) Prior Publication Data
US 2014/0191698 A1    Jul. 10, 2014

(30) Foreign Application Priority Data

May 30, 2011    (DE) .................. 10 2011 076 676

(51) Int. Cl.
*H02P 1/30*    (2006.01)
*H02P 27/06*    (2006.01)
*H02M 7/5395*    (2006.01)

(52) U.S. Cl.
CPC .......... *H02P 27/06* (2013.01); *H02M 7/5395* (2013.01)

(58) Field of Classification Search
CPC ...... H02P 25/22; H02P 23/0095; H02P 27/08; H02P 6/085

(Continued)

(56) References Cited

U.S. PATENT DOCUMENTS 4,628,240 A * 12/1986 Kurakake ............. H02P 25/021
 318/722
4,782,272 A * 11/1988 Buckley ................ H02K 29/08
 318/400.01

(Continued)

FOREIGN PATENT DOCUMENTS

CN    1989469 A    6/2007
CN    102067432 A    5/2011

(Continued)

OTHER PUBLICATIONS

International Search Report for PCT/EP2012/058705, issued on Oct. 19, 2012.

(Continued)

*Primary Examiner* — Bentsu Ro
*Assistant Examiner* — Thai Dinh
(74) *Attorney, Agent, or Firm* — Gerard Messina

(57) ABSTRACT

A method is described for activating a multiphase machine that has a link circuit equipped with a link circuit capacitor, phase windings, and one high-side switch and one low-side switch per phase. The switches associated with the individual phases have control signals applied to them by a control unit. The control unit provides, in successive activation cycles, pulse-shaped control signals for the switches, the pulse widths and pulse onsets of which are respectively varied within an activation cycle in such a way that the link circuit current is reduced.

7 Claims, 7 Drawing Sheets

(58) Field of Classification Search
USPC ...... 318/400.2, 400.22, 400.26, 400.27, 599, 318/724, 496, 503
See application file for complete search history.

(56) References Cited

U.S. PATENT DOCUMENTS

| | | | | |
|---|---|---|---|---|
| 5,821,722 | A * | 10/1998 | Forbes | H02P 6/08 318/400.11 |
| 6,529,393 | B1 * | 3/2003 | Yu | H02M 7/497 318/811 |
| 7,218,071 | B1 * | 5/2007 | Welchko | H02P 6/085 318/432 |
| 2007/0001633 | A1 * | 1/2007 | Su | H02P 6/10 318/822 |
| 2009/0251096 | A1 * | 10/2009 | Schulz | H02P 6/10 318/801 |
| 2010/0060211 | A1 * | 3/2010 | Hashimoto | H02P 27/08 318/400.02 |
| 2010/0072928 | A1 * | 3/2010 | Welchko | B60L 11/1803 318/400.13 |
| 2011/0006710 | A1 * | 1/2011 | Kondo | H02P 6/14 318/400.03 |
| 2011/0164443 | A1 * | 7/2011 | Chen | H02M 7/53873 363/132 |
| 2011/0221375 | A1 * | 9/2011 | Suzuki | B62D 5/046 318/496 |

FOREIGN PATENT DOCUMENTS

| | | |
|---|---|---|
| DE | 102008042352 | 4/2010 |
| JP | 200551838 | 2/2005 |
| WO | 2005/034333 A1 | 4/2005 |
| WO | 2010034793 | 4/2010 |

OTHER PUBLICATIONS

Wu et al., "A PWM AC to DC Convertor with Fixed Switching Frequency", Conference Record of the Industry Applications Society Annual Meeting (IAS), pp. 706-711, 1998.

Hobraiche et al., "A New Strategy to Reduce the Inverter Input Current Ripples", IEEE Transactions on Power Electronics, pp. 172-180, 2009.

Rusong Vvu, et al. " A PWM AC-to-DC Converter with Fixed Switching Frequency", IEEE Transactions on Industry Applications, vol. 26, No. 5 (1990), pp. 880-885.

* cited by examiner

FIG. 4
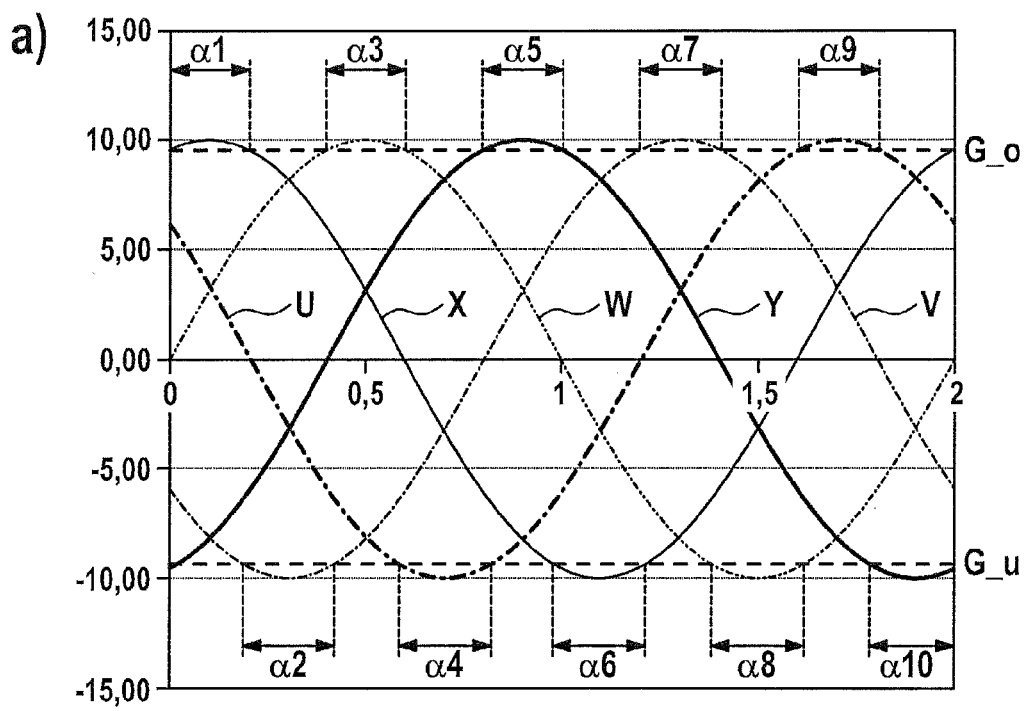
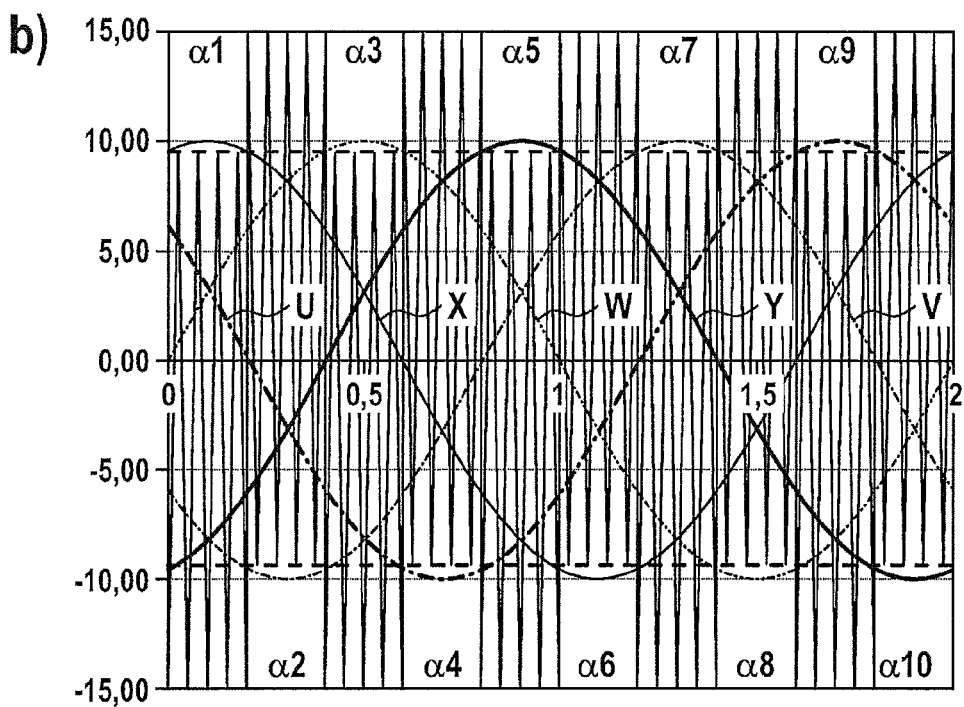

METHOD FOR ACTUATING A POLYPHASE MACHINE

FIELD OF THE INVENTION

The present invention relates to a method for activating a multiphase machine.

BACKGROUND INFORMATION

Electrical rotating-field drives are known. A variety of modulation modes, as indicated in German Published Patent Application No. 10 2008 042 352, are used therein, for example sine-wave modulation, or block modulation or block commutation.

So-called start-stop systems are also known. These serve to stop and restart internal combustion engines, for example when stopped at a traffic light. Start-stop systems of this kind are used in order to reduce the fuel consumption and exhaust emissions of the respective vehicle. Start-stop systems based on a conventional starter exist, the starter being activated by an electronic control device and engaging by way of a pinion into the ring gear on the flywheel. Also known are starter generators having a belt drive, which operate on the basis of a claw pole generator having an additional electronic control device.

Systems having higher power outputs are necessary in order to allow higher energies to be recovered when the vehicle is braking. Clock-timed methods, which require a link circuit having a high-capacitance link circuit capacitor, are used in order to limit the currents. The dimensioning of the link circuit is often crucial in terms of the space requirement of the power electronics.

SUMMARY

A method according to the present invention has the advantage, in contrast thereto, that the link circuit currents that occur can be reduced by up to 40% as compared with known activation methods. This advantage is achieved by a method for activating a multiphase machine that has a link circuit equipped with a link circuit capacitor and one high-side switch, one low-side switch per phase, and a phase winding, the switches associated with the individual phases having control signals applied to them by a control unit and the control unit providing, in successive activation cycles, pulse-shaped control signals for the switches, the pulse widths and pulse onsets of which are respectively varied within an activation cycle in such a way that the link circuit current is reduced.

This preferably occurs in such a way that the control unit activates the switches associated with the individual phases using the flat-top method, and shifts control signals for the switches relative to one another in successive flat-top windows. This in turn is preferably done in such a way that overlaps of positive phase currents are reduced, and/or positive and negative phase currents at least partly compensate for one another. This shifting of the control signals generates an activation pattern on the basis of which the current distribution becomes broadened in such a way that the effective value of the link circuit current, and thus the thermal load on the link circuit capacitor, is reduced.

BRIEF DESCRIPTION OF THE DRAWINGS

FIG. 4 shows diagrams to illustrate a five-phase sine-wave system.

DETAILED DESCRIPTION

The invention relates to a method for activating a multiphase machine that has a link circuit capacitor and one high-side switch, one low-side switch per phase, and a phase winding, the switches associated with the individual phases having control signals applied to them by a control unit. This method is not confined to a specific number of phases of the machine, but is explained in further detail below with reference to a five-phase machine.

Figure 1:
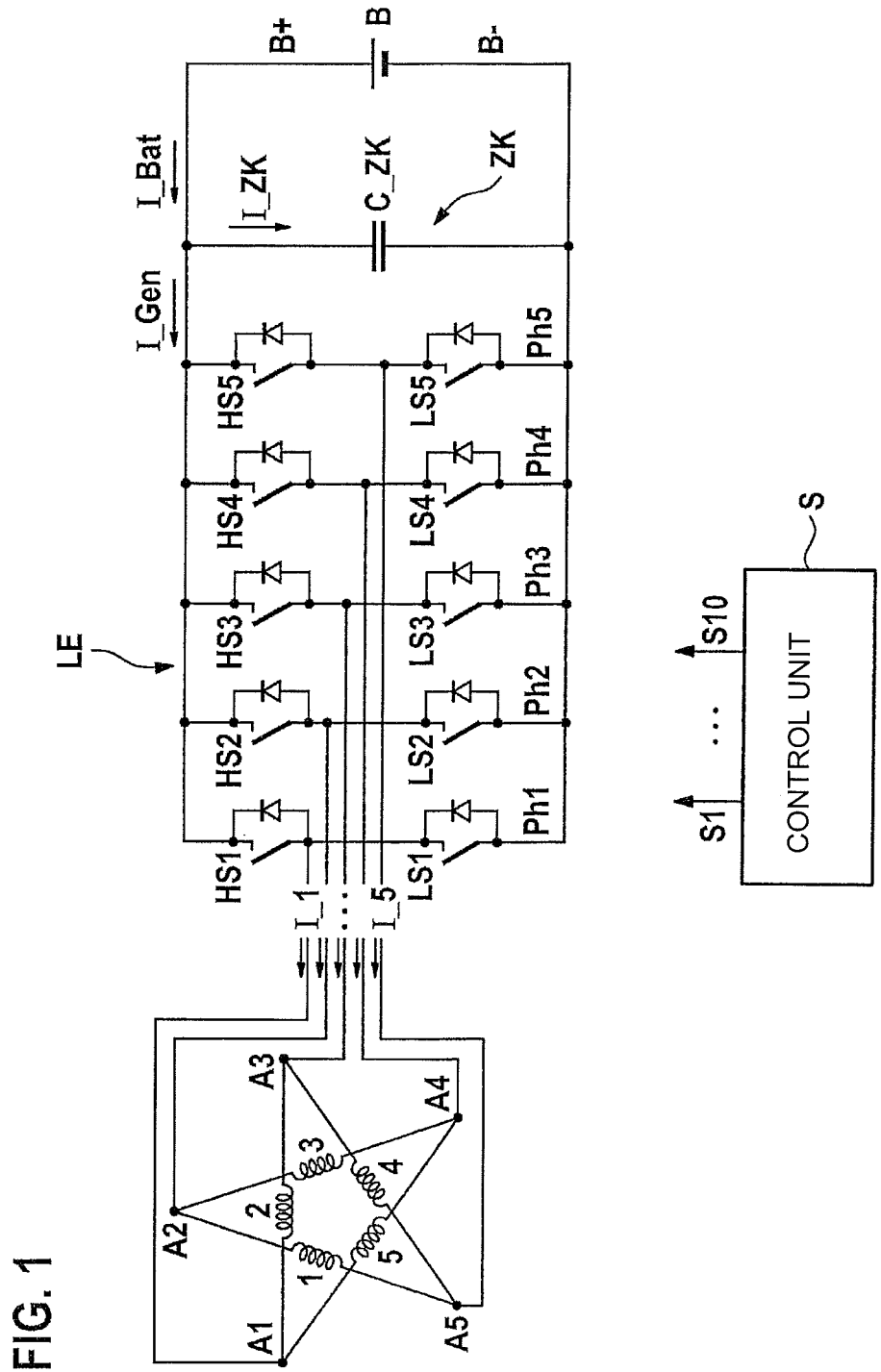
FIG. 1 is a sketch to explain a five-phase machine in a pentagram disposition having a B10 bridge.

FIG. 1 is a sketch to explain a five-phase machine in a pentagram disposition having a B10 bridge. A "pentagram" disposition is understood as a type of circuit in which the total of five phase windings of the circuit are electrically interconnected in such a way that the shape of the circuit diagram yields a pentagram.

The machine shown has a total of five phase terminals A1, A2, A3, A4, A5, and a total of five phase windings 1, 2, 3, 4, 5, each of these phase windings being connected between two of the aforesaid phase terminals. The machine shown furthermore has a power electronics system LE connected to the phase terminals, and a battery B. Battery B has a positive pole B+ and a negative pole B−. Located between battery B and power electronics system LE is a link circuit ZK that contains a link circuit capacitor C_ZK.

Power electronics system LE contains five branches Ph1, Ph2, Ph3, Ph4, and Ph5, each of which encompasses a series circuit of two switches, each of these switches having a diode connected antiparallel with it. This disposition results when conventional field effect transistors are used as switches, since they contain an inverse diode. The use of other switch elements, however, for example IGBTs, is also possible in principle.

Branch Ph1 of power electronics system LE, which contains switches HS1 and LS1, is connected to phase terminal A1 of the stator of the machine at a connecting point between the two switches HS1 and LS1. Switch HS1 of branch Ph1 is a high-side switch. A diode is connected antiparallel to switch HS1. Switch LS1 of branch Ph1 is a low-side switch. A diode is connected antiparallel to switch LS1. Switches HS1 and LS1 are activated by control unit S using control signals S1 and S2.

Branch Ph2 of power electronics system LE, which contains switches HS2 and LS2, is connected to phase terminal A2 of the stator of the machine at a connecting point between the two switches HS2 and LS2. Switch HS2 of branch Ph2 is a high-side switch. A diode is connected antiparallel to switch HS2. Switch LS2 of branch Ph2 is a low-side switch. A diode is connected antiparallel to switch LS2. Switches HS2 and LS2 are activated by control unit S using control signals S3 and S4.

Branch Ph3 of power electronics system LE, which contains switches HS3 and LS3, is connected to phase terminal A3 of the stator of the machine at a connecting point between the two switches HS3 and LS3. Switch HS3 of branch Ph3 is a high-side switch. A diode is connected antiparallel to switch HS3. Switch LS3 of branch Ph3 is a low-side switch. A diode is connected antiparallel to switch LS3. Switches HS3 and LS3 are activated by control unit S using control signals S5 and S6.

Branch Ph4 of power electronics system LE, which contains switches HS4 and LS4, is connected to phase terminal A4 of the stator of the machine at a connecting point between switches HS4 and LS4. Switch HS4 of branch Ph4 is a high-side switch. A diode is connected antiparallel to switch HS4. Switch LS4 of branch Ph4 is a low-side switch. A diode is connected antiparallel to switch LS4. Switches HS4 and LS4 are activated by control unit S using control signals S7 and S8.

Branch Ph5 of power electronics system LE, which contains switches HS5 and LS5, is connected to phase terminal A5 of the stator of the machine at a connecting point between the two switches HS5 and LS5. Switch HS5 of branch Ph5 is a high-side switch. A diode is connected antiparallel to switch HS5. Switch LS5 of branch Ph5 is a low-side switch. A diode is connected antiparallel to switch LS5. Switches HS5 and LS5 are activated by control unit S using control signals S9 and S10.

When the machine shown in FIG. 1 is in operation, the following equation is valid for any arbitrary point in time:

$$I\_ZK = I\_Bat - I\_Gen.$$

The generator current I_Gen is obtained here, as a function of the position of the switches of the power electronics system, from a superposition of the phase current I_1 to I_5 for those phases whose high-side switches are conductive at the respective point in time.

So-called center-aligned activation is already known. In this, the time span for current flow is concentrated into a short time span. An activation pattern for a center-aligned activation of this kind, and currents occurring in that context, are illustrated in the diagrams shown in FIG. 2.

FIG. 2a depicts the activation signals for the switches, FIG. 2b the link circuit current I_ZK, FIG. 2c the voltage V_B+ present at the positive pole of the battery, FIG. 2d the battery current I_Bat, and FIG. 2e the phase currents I_X to I_Y.

Figure 2:
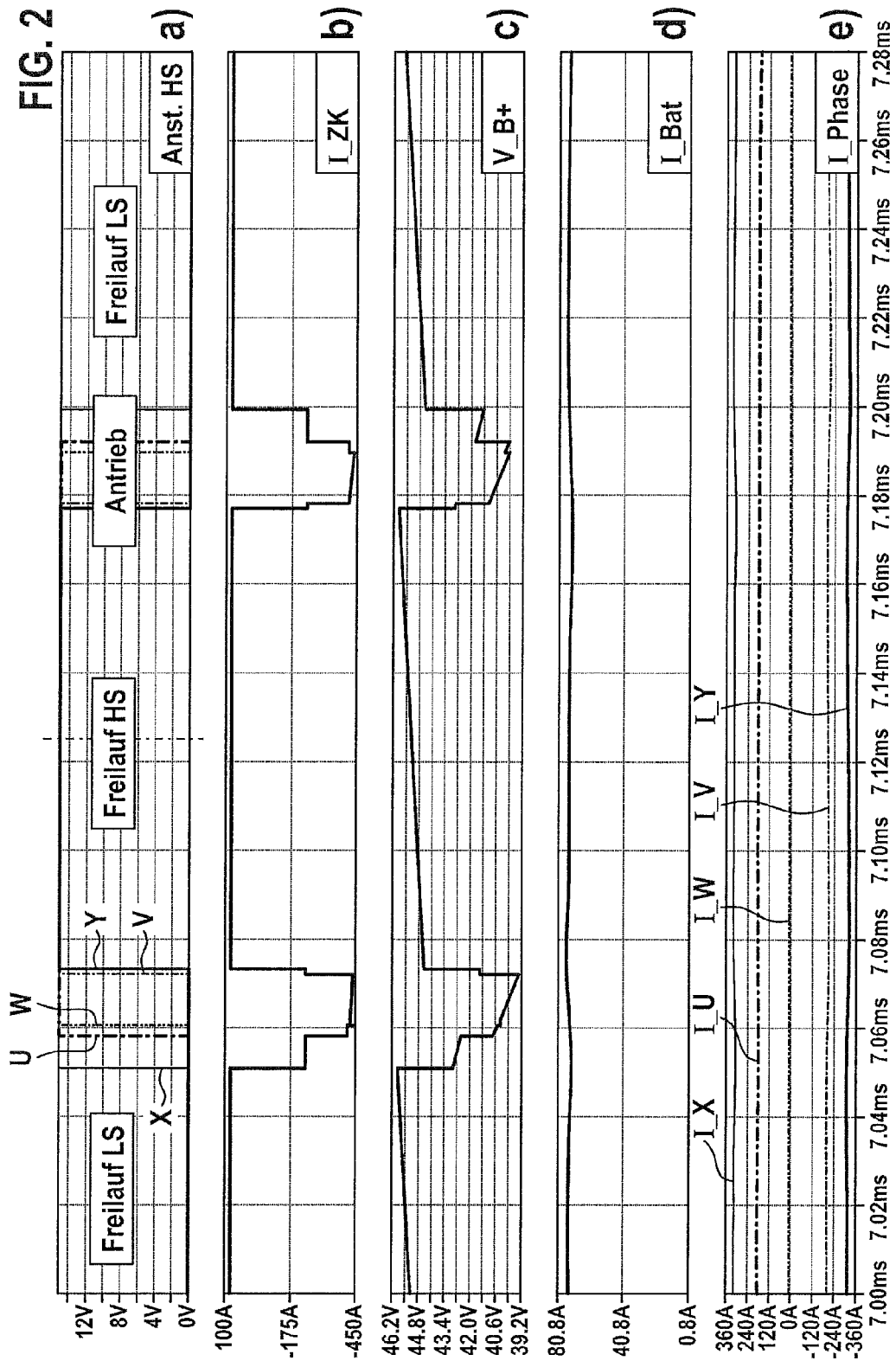
FIG. 2 shows diagrams to illustrate a known center-aligned activation pattern and currents occurring in that context.

From FIG. 2 it is apparent in particular that with center-aligned activation, the pulse centers of the activation pulses coincide in time, as indicated by a vertical dashed line in FIG. 2a. It is further evident from FIG. 2a that the edges of the activation pulses are different from one another in time, and are located in a limited time region. The legend "LS freewheel" indicates that in this time interval all low-side switches are conductive. The legend "HS freewheel" indicates that in this time interval all high-side switches are conductive. The legend "Drive" expresses the fact that in this narrow time window, the electrical machine is connected to the external voltage as a result of the switch positions. A change in current in the stator windings is thereby brought about. When an activation pulse is at the voltage level of 16 V, the respectively pertinent high-side switch is then made conductive. When an activation pulse is at a voltage level of 0 V, the respectively pertinent low-side switch is then made conductive.

It may be gathered from FIG. 2b that the link circuit current I_ZK is subject to large changes in the time region of the edges of the activation pulses, as will be illustrated in further detail with reference to FIG. 3.

It is evident from FIG. 2c that the battery voltage V_B+ is also subject to large changes in the time region of the edges of the activation pulses.

FIG. 2d shows the battery current I_Bat, and FIG. 2e the phase currents I_X to I_Y that make, or do not make, a contribution to the link circuit current as a function of the position of the respectively pertinent high-side switch.

Figure 3:
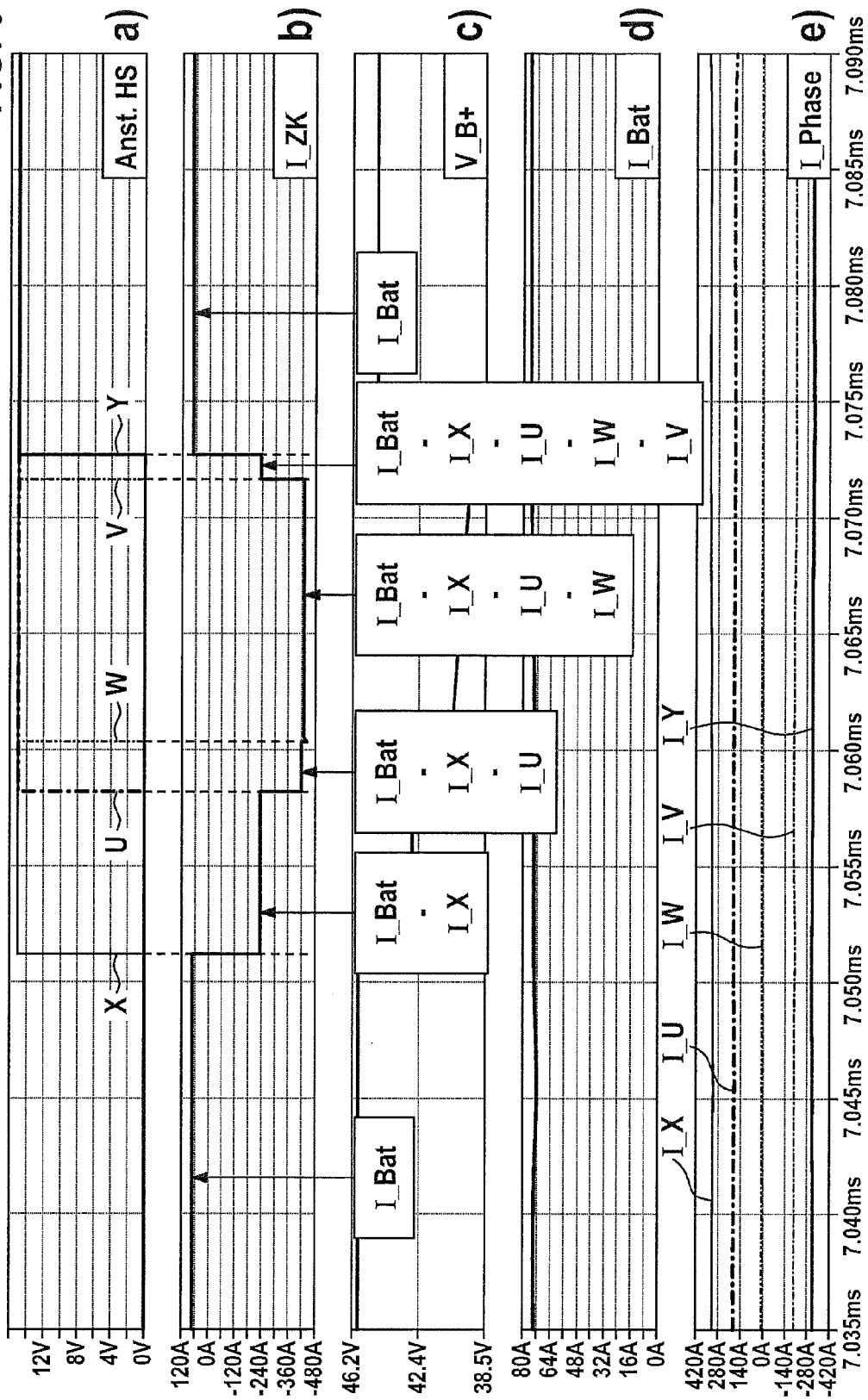
FIG. 3 is an enlarged portion of the diagrams shown in FIG. 2.

FIG. 3 shows an enlarged portion of the diagrams shown in FIG. 2. FIG. 3a once again shows the activation signals for the switches, FIG. 3b the link circuit current I_ZK, FIG. 3c the voltage V_B+ present at the positive pole of the battery, FIG. 3d the battery voltage I_Bat, and FIG. 3e the phase currents I_X to I_Y.

It is evident from FIG. 3b that the link circuit current I_ZK is constituted by a superposition of the battery current I_B at and the respectively active phase current or currents, and that in the case where the high-side switches pertinent to phase terminals X, U, and W are conductive, a high link circuit current flows (equal in the present example to approximately −420 A), while the battery current is approximately 80 A and the effective phase current is approximately 200 A.

In light of the foregoing, it is apparent from FIGS. 2 and 3 that when the known center-aligned activation procedure is used, current spikes that correlate in time with the individual switching events occur in the link circuit. During the freewheeling times that are indicated in FIG. 2, i.e. when all the high-side or low-side switches are closed, I_Gen=0. The following is then valid for the link circuit current: I_ZK=I_Bat. In this phase the link circuit capacitor becomes recharged. In the activation phase, the currents are summed.

When considering the power dissipation of the link circuit capacitor, the effective current is crucial. The applicable equation is:

$$X\left(\frac{1}{T} \cdot \int_0^T x(t)^2 \cdot dt\right)^{1/2}.$$

If the internal losses are ignored, the arithmetic mean of the capacitor current is zero. The effective value rises sharply when there is substantial addition of currents, i.e. when the current curve "spikes." Because of this sharp rise in the effective value, the thermal load on the link circuit capacitor is high. A high thermal load of this kind, which occurs when center-aligned activation is used, is avoided with a method according to the invention.

With the method according to the present invention, the current distribution is spread out as a result of a new activation pattern, and the effective value of the link circuit current, and the thermal load on the link circuit capacitor, are thus reduced.

FIG. 4a is a diagram to illustrate a five-phase sine-wave system as used with the present invention, the phase sequence in this diagram being modified as compared with the diagrams shown in FIGS. 2 and 3. Angles (in units of $\pi$) are plotted along the abscissa, and target voltage definitions for activation of the switches are plotted along the ordinate. The pertinent phase currents are labeled U, V, W, X, and Y. An upper limit value is labeled G_o, and a lower limit value G_u. These limit values are illustrated with dashed lines in FIG. 4a. The upper limit value G_o is slightly lower than the maximum positive target voltage value. The other limit value G_u is slightly higher than the minimum negative target voltage value.

The aforesaid limit values are ascertained as follows:

$$G\_o = U\_\text{target\_amplitude} * \cos(360°/(4*PN))$$

$$G\_u = G\_o,$$

where PN is the number of phases of the machine.

With the present invention, the control unit makes available for the switches, in successive activation cycles, pulse-shaped control signals whose pulse widths and pulse onsets are varied within an activation cycle in such a way that the link circuit current is reduced.

This is done, for example, using the flat-top method. With this method, specific switches are successively caused to be conductive, as will be explained below.

Marked in FIG. 4a are angle ranges or flat-top windows E1, . . . , α10 in which voltage definitions exist to the effect that the target voltage value associated with a current phase is either greater than the upper limit value G_o or less than the lower limit value G_u. If the target voltage value associated with a current phase is greater than the upper limit value G_o, then the pertinent high-side switch is made conductive in the pertinent angle range. Conversely, if the target voltage value associated with a current phase is less than the lower limit value G_u, then the pertinent low-side switch is made conductive in the pertinent angle range, as will be explained below with reference to FIG. 4b.

This Figure illustrates the generation of activation patterns for sine-wave-commutated electrical machines using a sine/triangle comparison. Application of an offset factor, which is respectively switched over at the time of a flat-top window switchover, to the triangle function automatically causes the ten participating switches to be made conductive in rotating fashion. The sine-wave signals correspond to the target voltage definitions.

It is evident from FIGS. 4a and 4b that in angle range α1, the high-side switch of phase X is conductive,
in angle range α2, the low-side switch of phase V is conductive,
in angle range α3, the high-side switch of phase W is conductive,
in angle range α4, the low-side switch of phase U is conductive,
in angle range α5, the high-side switch of phase Y is conductive,
in angle range α6, the low-side switch of phase X is conductive,
in angle range α7, the high-side switch of phase V is conductive,
in angle range α8, the low-side switch of phase W is conductive,
in angle range α9, the high-side switch of phase U is conductive,
in angle range α10, the low-side switch of phase Y is conductive.

Upon a phase shift of the current and voltage, it may be useful to shift the angle ranges α1 to α10 to the right or left; in the present case a maximum shift of 18°, generally 360°/(4*no. of phases), is possible.

In each of these angle ranges, leaving aside the phase current that pertains to the respectively conductive switch, all further phase currents are used to reduce the link circuit current. This is accomplished by the fact that the control unit, by way of a suitable activation pattern, shifts the aforesaid further phase currents relative to one another in such a way that the resulting link circuit current is reduced. This can be achieved by the fact that the shift of the aforesaid further phase currents is effected in such a way that overlaps of positive phase currents are reduced, and/or by the fact that the shift of the aforesaid further phase currents is effected in such a way that positive and negative phase currents at least partly compensate for one another.

Figure 5:
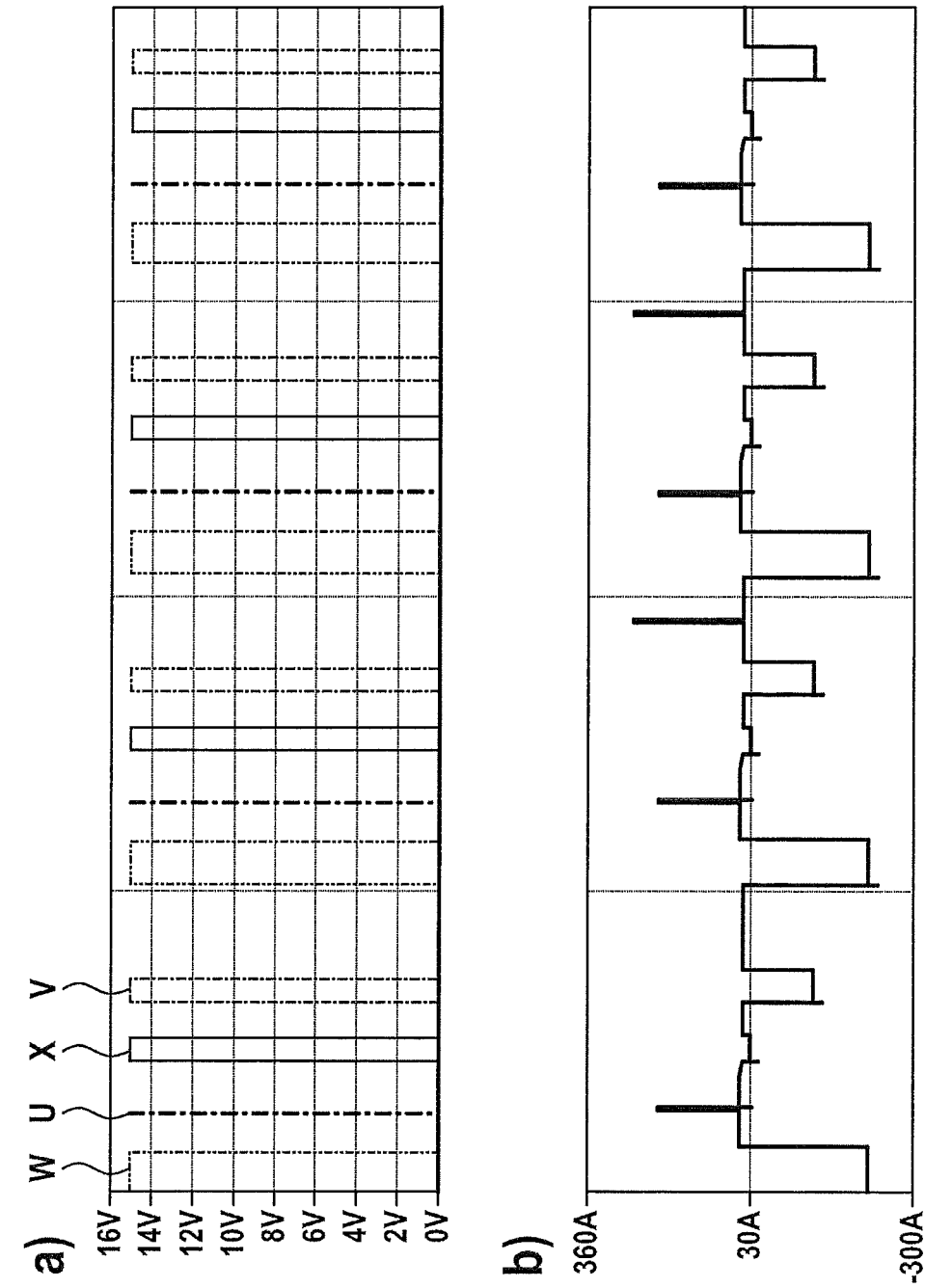
FIG. 5 shows diagrams to illustrate an activation pattern in accordance with the invention, and the link circuit current occurring in that context.

FIG. 5 shows diagrams to illustrate an activation pattern in accordance with the invention, and the link circuit current occurring in that context. FIG. 5a shows the activation pattern, and FIG. 5b the link circuit current occurring in that context. It is evident from FIG. 5a that the activation pulses, associated with the phases, for the respectively pertinent switches are separated from one another in time, i.e. are not superposed on one another. It is evident from FIG. 4b that with each switching operation according to FIG. 5a, a corresponding compensating current flows in the link circuit. The absolute values of the link circuit current are reduced, as compared with the link circuit current shown in FIG. 2b, by approx. 30%, and thus appreciably. This reduction is to be attributed to the fact that a large increase in the link circuit current is no longer occurring due to systematic superposition of the phase currents.

Figure 6:
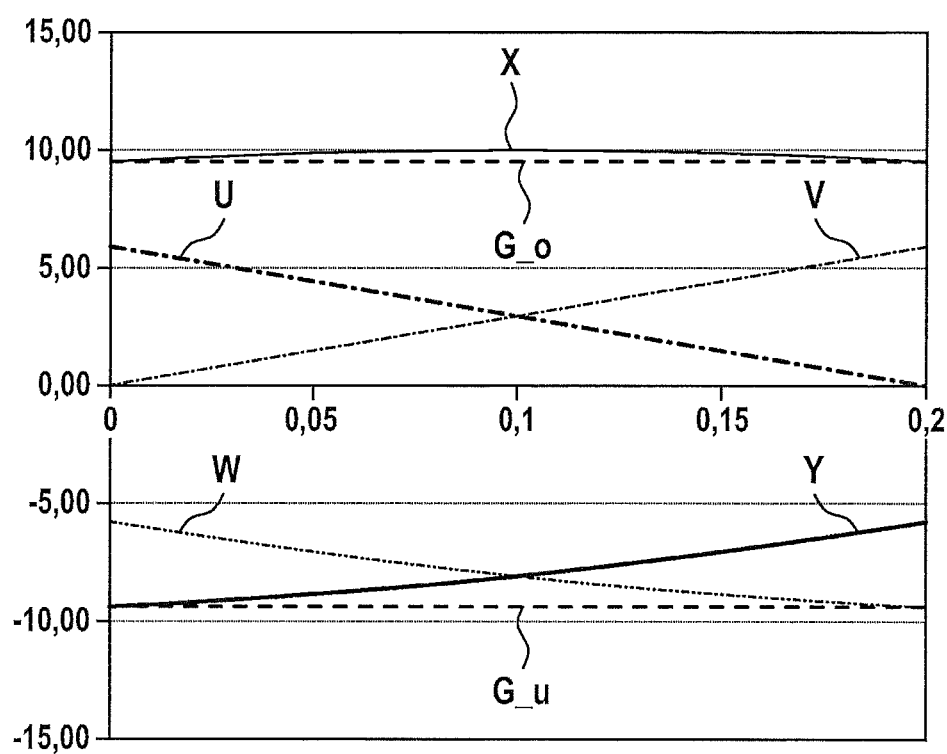
FIG. 6 is a diagram for detailed consideration of the voltage levels within a flat-top phase in the context of the five-phase sine-wave system shown in FIG. 4.

In a further optimization step the current peaks, extending in a positive direction, of the link circuit current shown in FIG. 5b can moreover be eliminated. This is explained with reference to FIG. 6, which is a diagram for detailed consideration of the voltage levels within a flat-top phase in the context of the five-phase sine-wave system shown in FIG. 4. In the diagram shown in FIG. 6, the angle in units of π( ) is again plotted along the abscissa, and target value definitions U_target for sine-wave activation are plotted along the ordinate. The phase currents are once again labeled U, V, W, X, and Y. An upper limit value is labeled G_o, and a lower limit value G_u. These limit values are depicted with dashed lines in FIG. 6. The angle region shown in FIG. 6 is located between 0 and 0.2π, and corresponds approximately to the angle region α1 shown in FIG. 4a. In this region α1, the high-side switch of phase X is conductive, so that (because of the flat-top method used) phase X is excluded from any clock timing. The further phase currents, i.e. the phase currents associated with phases U, V, W, and Y, are used in this angle range to reduce the link circuit current. For the purpose of this reduction in the link circuit current, an attempt is made to bring about a state in which the link circuit current is always moving in the vicinity of its zero line. Current components that result in addition of the battery current are particularly troublesome in this connection.

It is evident from FIG. 6, for example, that the phase currents pertinent to phases U and V each supply a positive current contribution that, in the case of an addition, would result in an undesired increase in the link circuit current.

This undesired superposition of the phase currents pertinent to phases U and V is avoided by the fact that the pertinent activation pulses are shifted in suitable fashion within an activation period. This shift can occur arbitrarily within an activation period without limiting the effect of a sine-wave commutation. The effective link circuit current can consequently be reduced even further if the activations of those phases both of whose switches are not conductive in the instantaneous flat-top window are shifted relative to one another in such a way that overlaps of positive or even negative phase currents are avoided, and/or that positive and negative phase currents compensate for one another at least in part.

It is evident from FIG. 6, for example, that at the angular position Phi=0 the following instantaneous values of the current levels exist:
I_V=0 A
I_X=9.51 A
I_U=5.88 A
I_W=−5.88 A
I_Y=−9.51 A.

As a result of the simultaneous activation of phases W and U, the pertinent phase currents I_W and I_U cancel each other out. In addition, phase currents I_X and I_Y also cancel each other out at this angular position, so that the total generator current I_Gen (see FIG. 1) is equal to 0 A and thus does not result in an undesired increase in the link circuit current.

It is also apparent from FIG. 6 that at the angular position Phi=0.1 the following instantaneous values of the current levels exist:
I_V=3.09 A
I_X=10 A A
I_U=−3.09 A
I_W=−8.09 A
I_Y=−8.09 A.

Figure 7:
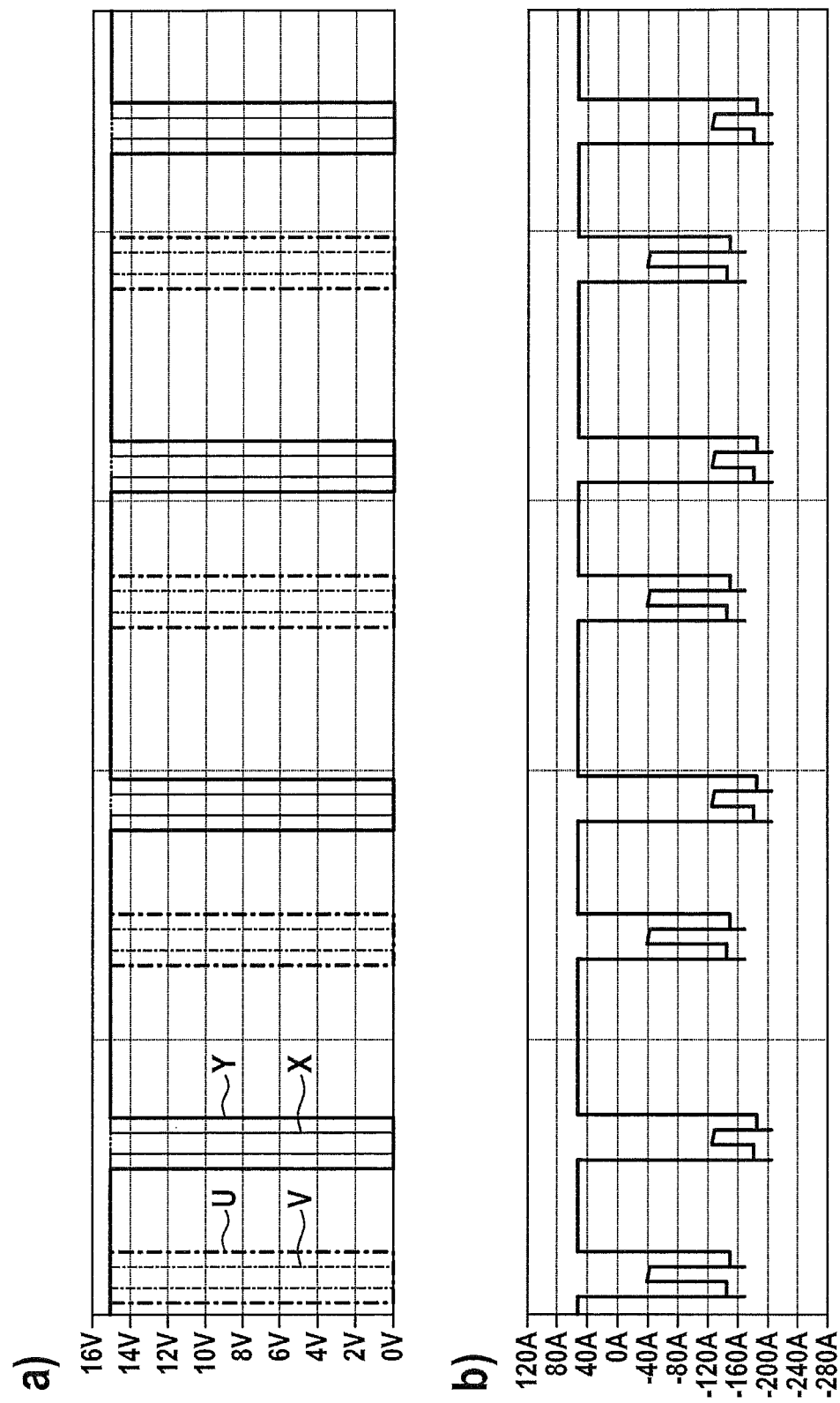
FIG. 7 shows diagrams to illustrate an activation pattern in accordance with a refinement of the invention, and the link circuit current occurring in that context.

FIG. 7 shows diagrams to illustrate an activation pattern in accordance with the above-described refinement of the invention, according to which a superposition of positive and negative phase currents occurs in such a way that the link circuit current is reduced, and to illustrate the link circuit current occurring in that context. FIG. 7a shows the activation pattern, and FIG. 7b the link circuit current occurring in that context. A comparison with FIG. 5b shows clearly that the positive spikes of the link circuit current are no longer present. It is evident from a comparison with FIG. 2b that the maximum amplitude of the link circuit current is reduced, and that the distribution of the link circuit current is broadened.

FIGS. 5 and 7 are selected differently in terms of the particular angular positions shown, and are therefore not directly comparable to one another. The desired effect—avoiding the positive spikes of the link circuit current that are shown in FIG. 5b—is, however, correctly illustrated in FIG. 7.

In light of the above, the invention makes available a method for activating a multiphase machine which results, with five-phase machines, in a reduction on the order of up to 40% in the effective link circuit currents.

What is claimed is:

1. A method for activating a multiphase machine that includes a link circuit equipped with a link circuit capacitor, phase windings, and one high-side switch and one low-side switch per phase, comprising:
   providing, by a control unit, in successive activation cycles, pulse-shaped control signals for the switches; and
   respectively varying pulse widths and pulse onsets of the control signals within an activation cycle in such a way that a link circuit current is reduced, wherein the control unit activates the switches associated with individual phases using a flat-top method, and shifts the control signals for the switches relative to one another in successive flat-top windows.

2. The method as recited in claim 1, wherein the control unit shifts the control signals for the switches with respect to one another in such a way that overlaps of positive or negative phase currents in the link circuit are reduced.

3. The method as recited in claim 1, wherein the control unit shifts the control signals for the switches with respect to one another in such a way that positive and negative phase currents in the link circuit at least partly compensate for one another.

4. The method as recited in claim 1, wherein:
   a number of the flat-top windows corresponds to twice a number of phases of the machine,
   successive flat-top windows respectively alternate between a high-side and a low-side, and
   a respective flat-top window is located in a region of a positive or negative maximum value of a respectively pertinent voltage definition.

5. The method as recited in claim 4, wherein the control unit causes the high-side and low-side switches associated with individual current phases to be successively made conductive, a high-side switch associated with a current phase being made conductive when a pertinent target voltage value is greater than an upper limit value, and a low-side switch associated with a current phase being made conductive when the pertinent target voltage value is less than a lower limit value.

6. The method as recited in claim 1, wherein:
   a number of the flat-top windows corresponds to a number of the phases of the machine,
   the flat-top windows refer only to a high-side or a low-side; and
   a respective flat-top window is located in a region of a positive or negative maximum value of a respectively pertinent voltage definition.

7. The method as recited in claim 1, wherein the reduction in the link circuit current is performed by shifting in time the control signals of the phases that are associated with a phase not presently conductive.

\* \* \* \* \*